Dec. 25, 1928.

F. C. RILE 1,696,285

FASTENING DEVICE

Filed March 12, 1928

INVENTOR
F. C. RILE

BY Munn &Co.

ATTORNEYS

Patented Dec. 25, 1928.

1,696,285

UNITED STATES PATENT OFFICE.

FREDERICK C. RILE, OF CHICAGO, ILLINOIS.

FASTENING DEVICE.

Application filed March 12, 1928. Serial No. 261,161.

My invention relates to improvements in fastening devices, and it consists in the combinations, constructions, and arrangements herein described and claimed.

An object of my invention is to provide a fastening device of the type employing a stationary arm and a movable arm, and in which means is employed for preventing the rotation of the fastening device after it has been inserted in a buttonhole or the like, thereby providing a device which cannot become accidentally removed from the buttonhole.

A further object is to provide a fastening device in which the spring means for moving the movable arm into locked engagement with the stationary arm is contained within a housing which is disposed within the buttonhole when the fastening device is passed through the latter, thereby providing a device which is relatively simple, compact, durable and efficient for the purpose intended.

Other objects and advantages will appear in the following specification, and the novel features of the invention will be particularly pointed out in the appended claims.

Figure 1:
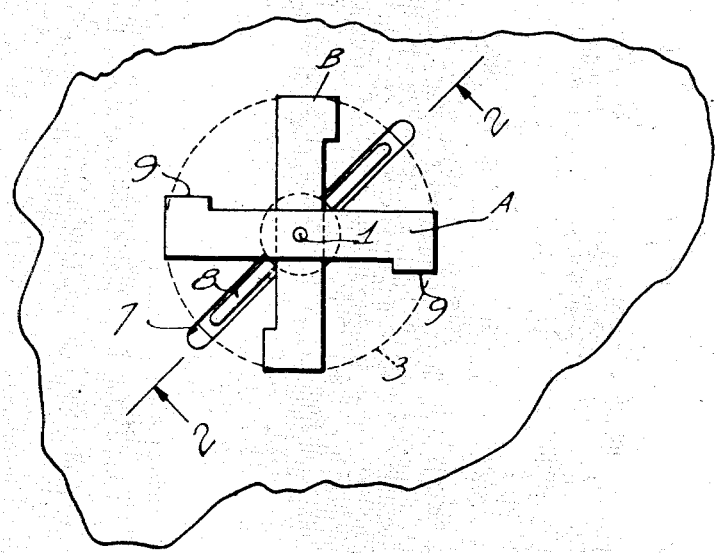
Figure 2:
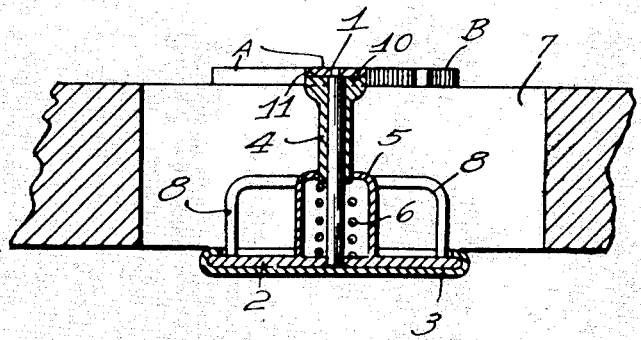
Figure 3:
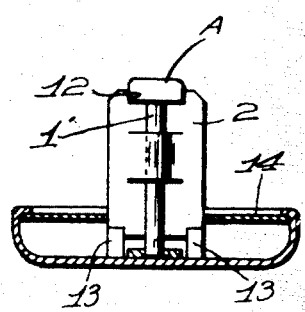
Figure 4:
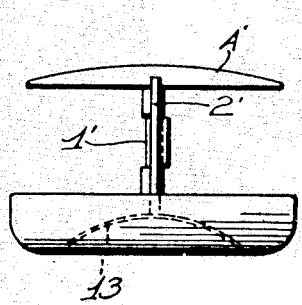

My invention is illustrated in the accompanying drawings, forming part of this application, in which Figure 1 is a plan view of my device showing the manner in which it may be employed, Figure 2 is a sectional view taken substantially along the line 2—2 of Figure 1, Figure 3 is a sectional detail view of a modified form of my device, and Figure 4 is an elevation taken at right angles to the device shown in Figure 3.

In carrying out my invention, I make use of arms A and B, the arm A being firmly secured to a center post or rivet 1. The arm A may be welded to the rivet 1. The rivet 1 is secured to a disc 2 which is rigidly retained by a base portion 3, see Figure 2. The arm B is provided with a sleeve portion 4 rotatable about the rivet 1 and projecting within a spring housing 5. A spring 6 is disposed within the housing 5 and bears against one end of the sleeve 4 for normally holding the arm B in locked engagement with the arm A. Means for preventing rotation of the fastening device after it has been inserted in a buttonhole 7 or the like consists in the provision of a pair of laterally extending arms 8. These arms may be welded to the housing 5 and the disc 2. The arms A and B are provided with lug portions 9, as shown in Figure 1. The arms A and B are provided with recesses 10 and 11 for interlocking when the movable arm B is disposed at right angles to the arm A.

From the foregoing description of the various parts of the device, the operation thereof may be readily understood. When it is desired to insert the device in the buttonhole 7, the movable arm B is pressed inwardly in the direction of the base for disengaging the arm B from the arm A and the arm B is then moved into longitudinal alignment with the arm A. At this time the arms are passed through the buttonhole 7 and the arm B is rotated about the rivet 1 for bringing the arm into a position at right angles to the arm A, whereupon pressure of the spring 6 against the sleeve 4 of the arm B will move the latter into locked engagement with the arm A. When the device is disposed within the buttonhole 7, the arms 8 are disposed within the buttonhole, as shown in Figure 1, so that the fastening device is firmly locked against rotation and is thereby prevented from becoming accidentally removed from the buttonhole.

In Figures 3 and 4, I have shown a modified form of my device in which an arm A' is secured to a rivet 1' supported by a flatlike brace member 2'. The brace member 2' is provided with a recess 12 within which the arm A' may be disposed. The brace member 2' is held against the arm A' by means of spring members 13. The brace member 2' passes through a slot in a disc portion 14. Thus it will be seen that the brace member 2' is held against rotation, but that it is held against the arm A' by reason of the springs 13.

In operation, the brace member 2' may be moved against the springs 13 for releasing the arm A', whereupon the latter may be moved into alignment with the brace member 2' and the device inserted in a buttonhole and the arm moved for bringing the latter into locked engagement with respect to the brace member 2'.

I claim:

1. A fastening device comprising a base, a stationary arm and a movable arm spaced away from the base, means for holding the stationary arm in spaced relation with respect to the base, sleeve means integral with said movable arm and rotatable about said first named means, housing means disposed between said movable and stationary arms and the base and closing a portion of said sleeve means, and spring means disposed within said housing means and bearing against said sleeve means for holding the movable arm in locked engagement with said stationary arm.

2. A fastening device comprising a base, a stationary arm and a movable arm spaced away from the base, means for holding the stationary arm in spaced relation with respect to the base, sleeve means integral with said movable arm and rotatable about said first named means, housing means disposed between said movable and stationary arms and the base and closing a portion of said sleeve means, spring means disposed within said housing means and bearing against said sleeve means for holding the movable arm in locked engagement with said stationary arm, and means for holding said fastening device against rotation when the fastening device is disposed in an aperture.

3. A fastening device comprising a base, a stationary arm and a movable arm spaced away from the base, means for holding the stationary arm in spaced relation with respect to the base, sleeve means integral with said movable arm and rotatable about said first named means, housing means disposed between said movable and stationary arms and the base and closing a portion of said sleeve means, spring means disposed within said housing means and bearing against said sleeve means for holding the movable arm in locked engagement with said stationary arm, and means for holding said fastening device against rotation when the fastening device is disposed in an aperture, said last named means being angularly disposed with respect to said movable and stationary arms when the latter are in locked position.

4. A fastening device comprising a base, a stationary arm and a movable arm spaced away from the base, means for holding the stationary arm in spaced relation with respect to the base, sleeve means integral with said movable arm and rotatable about said first named means, housing means disposed between said movable and stationary arms and the base and closing a portion of said sleeve means, spring means disposed within said housing means and bearing against said sleeve means for holding the movable arm in locked engagement with said stationary arm, and means for holding said fastening device against rotation when the fastening device is disposed in an aperture, said last named means being angularly disposed with respect to said movable and stationary arms when the latter are in locked position, said stationary and movable arms being provided with laterally extending lugs.

5. A fastening device comprising a stationary arm, a movable arm, a base, means disposed between said stationary arm and the movable arm for holding the movable and stationary arms in locked engagement, and means for holding the fastening device against rotation when said fastening device is inserted in an aperture.

Signed at Chicago, in the county of Cook, and State of Illinois this 3rd day of March, A. D. 1928.

FREDERICK C. RILE.